United States Patent
Xu et al.

(10) Patent No.: US 9,274,274 B1
(45) Date of Patent: Mar. 1, 2016

(54) ON-CHIP PATH-ENTANGLED PHOTONIC SOURCES BASED ON PERIODICAL POLING AND WAVEGUIDE CIRCUITS IN FERROELECTRIC CRYSTALS

(71) Applicants: Ping Xu, Nanjing (CN); Hua Jin, Nanjing (CN); Shining Zhu, Nanjing (CN)

(72) Inventors: Ping Xu, Nanjing (CN); Hua Jin, Nanjing (CN); Shining Zhu, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 14/590,284

(22) Filed: Jan. 6, 2015

(30) Foreign Application Priority Data

Oct. 16, 2014 (CN) .......................... 2014 1 05511732

(51) Int. Cl.
*G02B 6/12* (2006.01)
(52) U.S. Cl.
CPC ........ *G02B 6/12033* (2013.01); *G02B 6/12011* (2013.01); *G02B 6/12014* (2013.01); *G02B 6/12016* (2013.01); *G02B 6/12019* (2013.01); *G02B 2006/1204* (2013.01); *G02B 2006/1215* (2013.01); *G02B 2006/12142* (2013.01); *G02B 2006/12152* (2013.01); *G02B 2006/12159* (2013.01)

(58) Field of Classification Search
CPC ........... G02B 6/12016; G02B 6/12019; G02B 6/12011; G02B 6/125; G02B 6/126; G02F 1/225; G02F 1/395; G02F 1/3558; G02F 2001/3548
See application file for complete search history.

(56) References Cited

U.S. PATENT DOCUMENTS

2009/0103736 A1* 4/2009 Pacher .................. B82Y 10/00
380/278

OTHER PUBLICATIONS

A. Aspect, P. Grangier, and G. Roger, Phys. Rev. Let. 49, 91(1982).
V. Balić, D. A. Braje, P. Kolchin, G. Y. Yin, and S. E. Harris, Phys. Rev. Lett. 94, 183601 (2005).
H. Takesue, Y. Tokura, H. Fukuda, T. Tsuchizawa, T.Watanabe, K. Yamada, and S. Itabashi, Appl. Phys. Lett. 91, 201108, (2007).
J. E. Sharping, K. F. Lee, M. A. Foster, A. C. Turner, B. S. Schmidt, M. Lipson, A. L. Gaeta, and P. Kumar, Opt. Exp. 14, 12388, (2006).
J. E. Sharping, M. Fiorentino, and P. Kumar, Opt. Lett. 26, 367-369 (2001).
X. Li, P. L. Voss, J. E. Sharping, and P. Kumar, Phys. Rev. Lett. 94, 53601(2005).
Y. H. Shih and C. O. Alley, Phys. Rev. Lett. 61, 2921(1988).
Z. Y. Ou and L. Mandel, Phys. Rev. Lett. 61, 50(1988).

(Continued)

*Primary Examiner* — Michelle R Connelly
*Assistant Examiner* — Hoang Tran
(74) *Attorney, Agent, or Firm* — Treasure IP Group, LLC

(57) ABSTRACT

A photonic chip based on periodical poling and waveguides circuits in ferroelectric crystals, the method is based on the integration of waveguide circuits, periodical poling and electro-optic modulator (EOM). The chip is illustrated by FIG. 1. The waveguide circuits guide the photons and makes linear operations like the beam splitting, filtering etc. on the photons. The periodical poling enables the efficient spontaneous parametric down conversion (SPDC), resulting the generation of entangled photons. The EOM controls the phase of photons dynamically. The following directional coupler distributes the entangled photons and the quantum interference takes place, resulting different types of path-entangled states by controlling the voltage of EOM insides the chip.

11 Claims, 4 Drawing Sheets

(56) References Cited

OTHER PUBLICATIONS

C. E. Kuklewicz, M. Fiorentino, G. Messin, F. N. C. Wong, and J. H. Shapiro, Phys. Rev. A 69, 13807(2004).
V. Giovannetti, L. Maccone, J. H. Shapiro, and F. N. C. Wong, Phys. Rev. Lett. 88, 183602(2002).
M. C. Booth, M. Atatüre, G. Di Giuseppe, B. E. A. Saleh, A. V. Sergienko, and M. C. Teich, Phys. Rev. A 66, 023815 (2002).
X. Q. Yu, P. Xu, Z. D. Xie, J. F. Wang, H. Y. Leng, J. S. Zhao, S. N. Zhu, N. B. Ming, Phys Rev. Lett. 101, 233601 (2008).
S. Tanzilli, H. De Riedmatten, H. Tittel, H. Zbinden, P. Baldi, M. De Micheli, D. B. Ostrowsky, and N. Gisin, Electron. Lett. 37, 26 (2001).
K. Sanaka, K. Kawahara, and T. Kuga, Phys. Rev. Lett. 86, 5620 (2001).
A. Kanno, T. Sakamoto, A. Chiba, T. Kawanishi, K. Higuma, M. Sudou, and J. Ichikawa, IEICE Electron. Express 7, 817 (2010).
On-Chip Generation and Manipulation of Entangled Photons Based on Reconfigurable Lithium-Niobate Waveguide Circuits H. Jin,1 F. M. Liu,2 P. Xu,1,* J. L. Xia,2 M. L. Zhong,1 Y. Yuan,1 J.W. Zhou,2 Y. X. Gong,3 W. Wang,2 and S. N. Zhu1 Physical Review Letters, 113, 103601 (2014).

* cited by examiner

ON-CHIP PATH-ENTANGLED PHOTONIC SOURCES BASED ON PERIODICAL POLING AND WAVEGUIDE CIRCUITS IN FERROELECTRIC CRYSTALS

CROSS REFERENCE TO RELATED APPLICATION

This application claims priority to Chinese Application No. 2014105511732, filed on Oct. 16, 2014. The Chinese Application is incorporated herein by reference in its entirety.

FIELD OF THE INVENTION

The present disclosure is generally directed at both quantum information technologies, photo-electronic technologies, nonlinear optic and more specifically it is directed at integrated quantum optics.

BACKGROUND OF THE INVENTION

Photonic entanglement is the key resource in quantum technologies such as quantum communication, quantum computing, therefore to engineer the entangled sources especially with controllability, high-efficiency, stability and portability has always been a popular topic in the quantum community. Traditionally the ways to generate entangled photons include: (1) the atomic transition [1]; (2) four-wave-mixing (FWM) in the atomic ensembles [2]; (3) FWM in silicon, silica-on-silicon [3,4] or fibers [5,6]; (4) Spontaneously parametric down conversion (SPDC) processes in quadratic nonlinear crystals [7,8]. The first way based on the cascaded atomic transition was adopted in the early stage of quantum optical experiments and eventually was abandoned since the generated two-photon state is not perfect. Nowadays people usually adopt the other three ways. Among them, the most commonly used way is the quadratic process in nonlinear optical crystals since it is involved with high photon-flux and simple setups. In the quadratic nonlinear crystals, a pump photon will split into a pair of down converted photons, namely the signal and idler or the entangled photon pair with lower frequencies. During this process, the energy conservation and momentum conservation must be satisfied. There are two types of momentum conversation or phase-matching ways according to different types of nonlinear crystals. One is the homogeneous birefringence phase-matching (BPM) crystal and the other one is the optical superlattice or quadratic nonlinear photonic crystal (NPC). The NPC is an artificial nonlinear optical crystalwhich is fabricated based by the domain-engineering technique in the ferroelectric crystals like lithium niobate (LN) or lithium tantalate (LT). Due to the large nonlinear coefficient being used, it can produce entangled photons with high-photon flux at desirable wavelength [9-12]. Particularly the SPDC efficiency can be further enhanced when the NPC is fabricated into waveguides [13, 14].

However, from the BPM crystal, NPC and waveguide NPC, usually only one single entangled source can be generated. In addition a lot of external optical elements should be used to manipulate the entangled photons including interfering, filtering, collecting etc. which will bring challenges to the size, stability and scalability of the entangled sources.

SUMMARY OF THE INVENTION

This disclosure is directed at a method and apparatus for on-chip entangled sources, solving the aforementioned challenges. The methodology is to improve the integration complexity, scalability, stability, and portability of entangled sources by taking advantage of integrated optical techniques. Specifically this disclosure is directed at on-chip quantum light sources based on the integration of periodical poling, waveguide circuits and eletrooptic modulator (EOM) on a single ferroelectric crystal. The guided pump laser is split into two paths by a waveguide Y-junction, and then the pump photon at either path can split into a pair of entangled photons. This photon pair from either path will interfere at the directional coupler, resulting different quantum states by changing the voltage applied on the internal EOM.

The key element of this disclosure is making periodically poling and waveguide circuits on ferroelectric materials like lithium niobate etc., achieving the generation and manipulation of entangled photons simultaneously. This disclosure enables the conversion from classical laser to controllable quantum states and different states are achieved by the adjusting the working voltage of the on-chip EOM. The whole chip can be divided into three sections. The first region (Region I) manipulates the classical pump laser, including the beam-splitting and EOM. Region II is the periodical poling region wherein the nonlinear process takes place. It converts the pump beam into entangled photons through quasi-phase-matched SPDC process. The photon pair emits from either one of two paths, constructing a bunched state $(|2,0\rangle+e^{i\phi}|0,2\rangle)/\sqrt{2}$. Region III manipulates the entangled photons, realizing Hong-Ou-Mandel (HOM) interference on the waveguide directional coupler. If two-photon phases from two paths are identical, the bunched state will convert into a deterministically separate state after the HOM interferometer, i.e. $(|2,0\rangle+|0,2\rangle)/\sqrt{2} \to |1,1\rangle$. If the phase difference $\phi=\pi$, the output state after the HOM interferometer is still a bunched state but with the form of $(|2,0\rangle-|0,2\rangle)/\sqrt{2}$. In general, the output state is a superposition of bunched state and separate state $1/\sqrt{2}(|2,0\rangle-|0,2\rangle)\sin(\phi/2)+|1,1\rangle\cos(\phi/2)$. Region III also comprises the pump filters, wherein the entangled photons are coupled into two outer waveguides by evanescent waves while the pump beams remains in the original waveguides.

The key point of this disclosure is making periodical poling in the ferroelectric waveguide circuits. The poling structure refers to all the one-dimensional poling sequences such as periodical, aperiodic and chirped ones. The substrate materials comprise several common-used ferroelectric crystals such as lithium niobate, lithium tantalate and potassium titanium oxygenic phosphate (KTP). The SPDC in periodically poled waveguide can be degenerate or not degenerate. The interferometer is embedded in waveguide circuits to further manipulate the generated entangled photon, resulting different quantum states by controlling the working condition of interferometer. The waveguide interferometers include the Hong-Ou-Mandel, Mach-Zehnder, Michelson, Franson interferometer and a combination of some of these basic ones. In addition, the technical ways to fabricate waveguide circuits contain the proton-exchange, Titanium-diffusion (Ti-diffusion) and machining methods.

The beneficial effects of this disclosure are based on several features of ferroelectric crystals. We take lithium niobate as the example. Firstly, the nonlinear coefficient is large and can be engineered artificially which enables the generation of bright photon pairs by fulfilling the quasi-phase-matching condition in the SPDC process. Moreover, the wavelength of entangled photons can be flexibly designed through changing the poling period. Secondly, the lithium niobate contains large electro-optic coefficient which can realize fast and precise phase control of photons. The reparation rate of electrooptic modulator is 40 GHz (100 GHz in lab [15]). Finally, the lithium niobate crystal can be fabricated into waveguides by the methods of proton-exchange, Ti-diffusion and so on which can further improve the SPDC efficiency. Meanwhile, linear optical computing can be approached by designing the waveguide circuits which makes the lithium niobate a potential platform of quantum information processing. This disclosure is directed at a quantum source chip based on the above-mentioned advantages of ferroelectric crystals, supplying compact, stable, portable entangled sources.

DETAILED DESCRIPTION OF THE EMBODIMENTS OF THE INVENTION

The following is the detailed instruction of LN photonic chip. On a single z-cut LN substrate, there are periodically poling structures for the generation of entangled photons, waveguide circuits for manipulating the pump laser and entangled photons and the eletrooptic modulator for controlling the phase of photons. The chip can be divided into three regions. Region I manipulates the classical pump laser, including the beam-splitting and EO phase-modulation. Region II is the periodical poling region wherein the nonlinear process takes place. It converts the pump beam into entangled photons through quasi-phase-matched SPDC process. The photon pair emits from either one of two paths, constructing a bunched state $(|2,0\rangle+e^{i\phi}|0,2\rangle)/\sqrt{2}$. Region III manipulates the entangled photons, realizing Hong-Ou-Mandel (HOM) interference on the waveguide directional coupler. If two-photon phases from two paths are identical, the bunched state will convert into a deterministically separate state after the HOM interferometer, i.e. $(|2,0\rangle+|0,2\rangle)/\sqrt{2} \rightarrow |1,1\rangle$. If the phase difference $\phi=\pi$, the output state after the HOM interferometer is still a bunched state but with the form of $(|2,0\rangle-|0,2\rangle)/\sqrt{2}$. In general, the output state is a superposition of bunched state and separate state $1/\sqrt{2}(|2,0\rangle-|0,2\rangle)\sin(\phi/2)+|1,1\rangle\cos(\phi/2)$. Region III also comprises the pump filters, wherein the entangled photons are coupled into two outer waveguides by evanescent waves while the pump beams remains in the original waveguides. The phase difference $\phi$ in the bunched state generated from Region II is adjusted by electro-optic effect. The EM modulator adopts push-pull configuration i.e. the phase of photons in one path will decrease with an equivalent value as the increasing phase in the other path.

Figure 1:
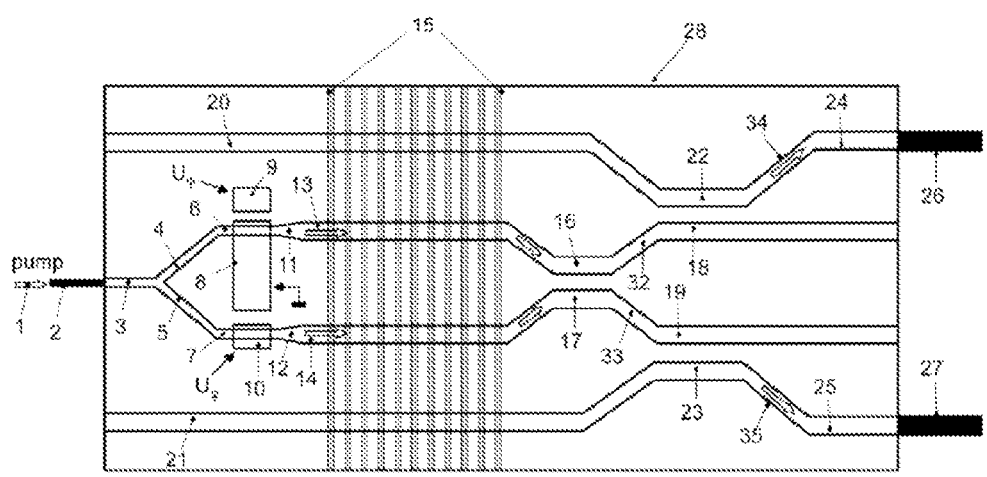
FIG. 1 is the sketch of the quantum source chip.

The LN photonic chip is sketched as FIG. 1. We label every element of this chip. The LN photonic chip (28) is connected with input (2) and output fibers (26, 27), which are fixed with the LN wafer by using UV-curing adhesive (not shown). The fiber (2) couples the pump laser into the chip by the input waveguide (3). The waveguide Y-junction split the pump beam into waveguide 4 and 5. The first three waveguides 3-5 are designed to support a single mode at pump wavelength. The intersecting angle of waveguide 4 and 5 is less than 1°; The transition waveguides 6 and 7 transforms waveguides 4 and 5 into waveguides 13 and 14 which support the single mode at the wavelength of entangled photons. Above the waveguides 6 and 7, there are three electrodes 8, 9 and 10 for adjusting the phase between two pump beam in waveguides 13 and 14; in waveguides 13 and 14, the pump beam converts into entangled photons and after that entangled photons interfere when they reach the waveguide beam-splitter; the interval between parallel waveguides 16 and 17 in the beamsplitter is designed to be haft of the coupling length; after the interferometer, the path-entangled photons propagate along waveguides 32 and 33, which connect the curved waveguides and the straight waveguides 18 and 19; directional couplers are cascaded to filter the pump, wherein the parallel waveguides 18&22 enable the transferring of entangled photons from waveguide 32 into bending waveguide 32 then straight waveguide 24, while the parallel waveguides 19&23 enables the transferring of entangled photons from waveguide 33 into the bending waveguide 35 then the straight waveguide 25.

Figure 2:
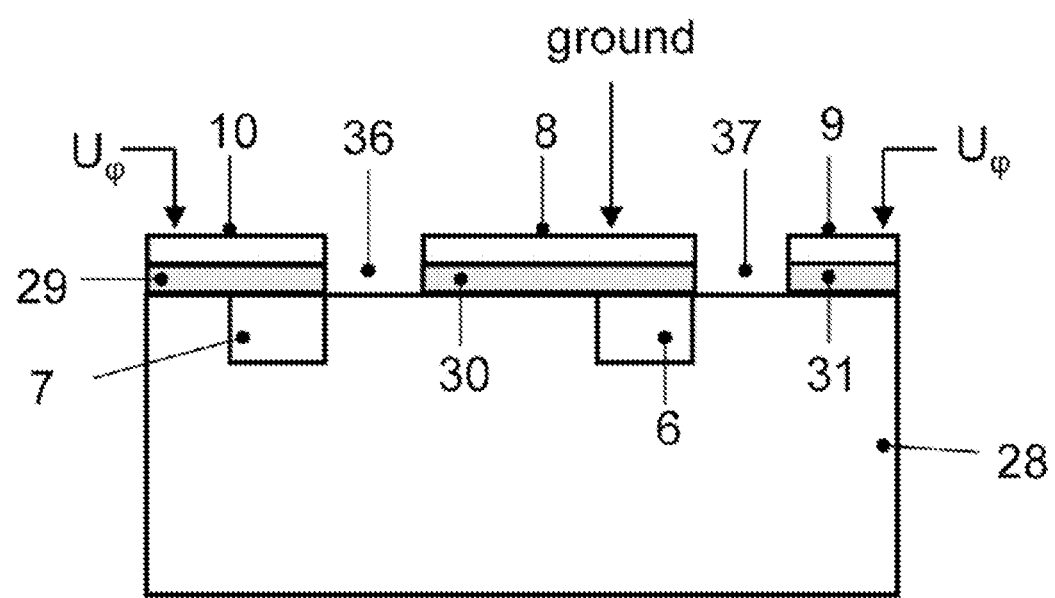
FIG. 2 is the structure of EM modulator.

FIG. 2 shows the cross section of the phase shifter mentioned in FIG. 1. An electrode 8 is positioned above waveguide 6 and connected to ground. Next to it (with an interval of 6 μm on both sides) are two electrodes 9, 10 which are connected to a direct current (DC) voltage $U_\phi$, and electrode 10 is positioned above waveguide 7. An buffer layer (e.g. silicon oxide with a thickness of 200 nm) 29, 30, 31 between the electrodes 8, 9, 10 and substrate 28 is used to reduce the propagation loss induced by the electrodes 8, 9, 10. The buffer layer is etched along the gap 36, 37 of electrode pairs to suppress DC drift. The EOM can also be designed on the waveguide 13, 14 just after the periodically poling region. In this way, the EOM changes the phase of entangled photons directly.

Figure 3:
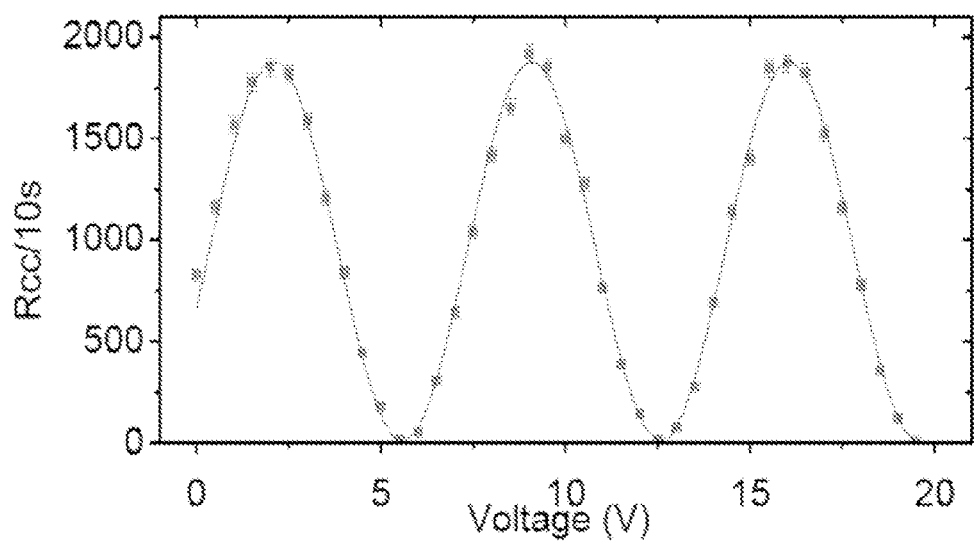
FIG. 3 is the output path-entangled state under different voltages for one embodiment of LN photonic chip.

In this embodiment, the electrode pairs 8, 9, 10 are designed to be ~8 mm length. The pump wavelength is 780 nm and the degenerate photon pairs are 1560 nm. The length of the whole LN chip 28 is 50 mm. $2\pi$ phase-shift of the pump in waveguides 6, 7 can be achieved by a DC voltage of ~7.1V which makes the output state vary from the bunched state to the separated state then back to a bunched state. FIG. 3 is the coincidence counting rate between photons from output fibers (26, 27) under different voltages. The coincidence counts change periodically (the period is 7.1 V) with the applied voltage. The maximum and minimum points in FIG. 3 correspond the separate and bunched states. The first separate state is achieved at 2.3 V (theoretically it should be 0 V) which is named as the offset bias voltage.

Figure 4:
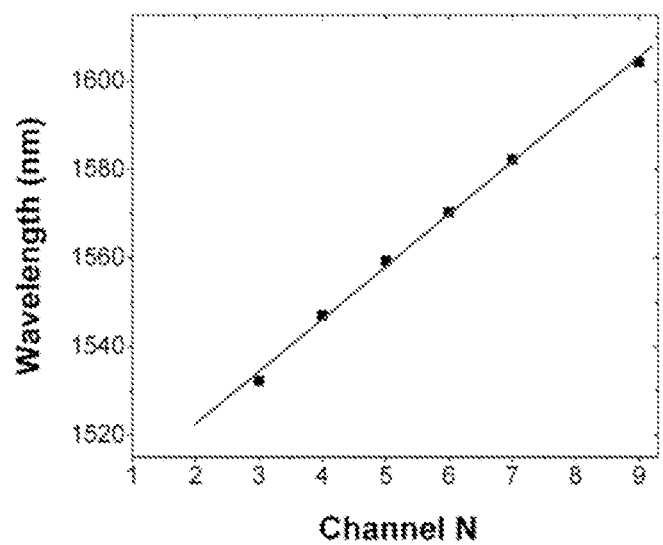
FIG. 4 is the wavelength of entangled photons generated from different LN photonic chips with different poling periods.

The poling period in region 15 is designed according to $\beta_p-\beta_s-\beta_i=2\pi/\Lambda$ for ensuring the quasi-phase-matching condition of the SPDC process, wherein $\beta_p$, $\beta_s$, $\beta_i$ are the propagation constants of fundamental modes of pump, signal and idler photons in the waveguide, respectively. The propagation constants are decided by the dispersion of lithium niobate and the fabrication technology of waveguides. The proton-exchange waveguide can only support e-polarized beam, thus the maximum nonlinear coefficient $d_{33}$ can be used. Based on the fabrication technology we adopted for the waveguides, the poling period is 15.32 μm for the 1560 nm degenerate pairs generated at room temperature. By changing the poling period, the LN chip can work for different degenerate SPDC processes emit different wavelengths of entangled photons. FIG. 4 shows nine SPDC processes on nine units from the same LN wafer with different poling periods. The poling periods range from 14.36 μm to 16.28 μm with the step of 0.24 μm. In FIG. 4 we measure the working wavelengths of second harmonic generation (SHG) processes at 25.5° C. for different poling waveguides. The nine units covers the telecom c- and L-bands. The SHG process is just reverse to the degenerate SPDC process.

We claim:

1. A method to configure a photonic chip based on periodical poling and waveguides circuits in ferroelectric crystals, said method is based on the integration of waveguide circuits, periodical poling and an electrooptic modulator (EOM), comprising: using the waveguide circuits to guide the photons and perform linear operations including beam-splitting, filtering on photons;

using the periodical poling to enable efficient spontaneous parametric down conversion (SPDC) and generation of a pair of entangled photons; controlling phase of the photons dynamically using the EOM; coupling the chip first with a classical pump beam and then splitting into two pump beams by a waveguide Y-junction; and using the periodical poling region to generate the pair of entangled photons from either of two pump beams;

distributing the pair of entangled photos subsequently using a directional waveguide coupler, performing quantum interference, and resulting different types of path-entangled states by controlling the voltage of EOM insides the chip; and making the waveguide circuits and domain modulation in certain regions on homogeneous ferroelectric substrate including lithium niobate (LN), wherein the-whole chip is divided into three regions, including:

a first region (Region I) manipulates the classical pump laser, and performs the beam-splitting and EOM;

a second region (Region II) is the periodical poling region where the nonlinear process takes place, and the second region converts the pump beam into the pair of entangled photons through quasi-phase-matched (QPM) SPDC process and the photon pair emits from either one of two paths, constructing a bunched state $(|2,0\rangle+e^{i\phi}|0,2\rangle)/\sqrt{2}$;

a third region (Region III) manipulates the pair of entangled photons, realizing Hong-Ou-Mandel (HOM) interference on the waveguide directional coupler, and Region III further comprises pump filters, and the entangled photons are coupled into two outer waveguides by evanescent waves while the pump beams remains in the original waveguides.

2. The method according to claim 1, wherein the chip comprises a number of separate components including:

a fiber (2) coupling a pump laser into the chip by an input waveguide (3);

a waveguide Y-coupler, splitting the pump beam into waveguide (4) and (5); first three waveguides (3-5), designed to support a single mode at pump wavelength; waveguides (4) and (5), having intersecting angles less than 1°; the transition waveguides (6) and (7), transforming waveguides (4) and (5) into waveguides (13) and (14), which support the single mode at the wavelength of the pair of entangled photons; three electrodes (8), (9) and (10), positioned above the waveguides (6) and (7), for adjusting the phase between two pump beams in waveguides (13) and (14); wherein in waveguides (13) and (14), the pump beam converts into the entangled photons and after that entangled photons interfere when they reach the waveguide beam-splitter; the interval between parallel waveguides (16) and (17) in the beam-splitter is designed to be haft of the coupling length; after the interferometer, the path-entangled photons propagate along waveguides (32) and (33), which connect the curved waveguides and the straight waveguides (18) and (19); directional couplers are cascaded to filter the pump, wherein the parallel waveguides (18) and (22) enable the transferring of entangled photons from waveguide (32) into bending waveguide (32) then straight waveguide (24), while the parallel waveguides (19) and (23) enables the transferring of entangled photons from waveguide (33) into the bending waveguide (35) then the straight waveguide (25).

3. The method according to claim 1, wherein the periodical poling structure includes all the one-dimensional structures like periodical sequence, aperiodic sequence, and chirped structure.

4. The method according to claim 3, wherein the generation of entangled photons is by degenerate or non-degenerate SPDC processes in the periodically poled waveguides.

5. The method according to claim 3, wherein the manipulation of entangled photons by waveguide interferometers Hong-Ou-Mandel, Mach-Zehnder, Michelson or Franson interferometer and complex circuits composed by these basic interferometers.

6. The method according to claim 1, wherein the waveguide circuits is fabricated by the methods of proton-exchange, Titanium-diffusion and machining operation.

7. The method according to claim 1, wherein the phase of photons is controlled by electrooptic effect, and the EO modulator can be designed in the equivalent regions inside the chip, the EM modulator adopts a push-pull configuration, the phase of photons in one path decreasing the same amount as the phase increase in the other path.

8. The method according to claim 1, wherein the substrate materials includes the ferroelectric materials such as lithium niobate, lithium tantalate, KTP, which contain the ferroelectric domain and can be poled through by applying external electric field.

9. A photonic chip made by the method described in claim 8.

10. The method according to claim 1, wherein two-photon phases from two paths are identical, the bunched state will convert into a deterministically separate state after the HOM interferometer, i.e. $(|2,0\rangle+|0,2\rangle)/\sqrt{2}\rightarrow|1,1\rangle$.

11. The method according to claim 1, wherein the phase difference $\phi=\pi$, the output state after the HOM interferometer is still a bunched state but with the form of $(|2,0\rangle-|0,2\rangle)/\sqrt{2}$ and the output state is a superposition of bunched state and separate state $1/\sqrt{2}(|2,0\rangle-|0,2\rangle)\sin(\phi/2)+|1,1\rangle\cos(\phi/2)$.

* * * * *